July 24, 1962   H. W. KOGAN ET AL   3,045,874
AIR EXPANSION DISPENSER WITH METERING MEANS
Filed April 1, 1960   3 Sheets-Sheet 1

INVENTORS
HENRY WOLF KOGAN
THOMAS EDMUND NOAKES
BY
WILSON, LEWIS & McRAE
ATTORNEYS

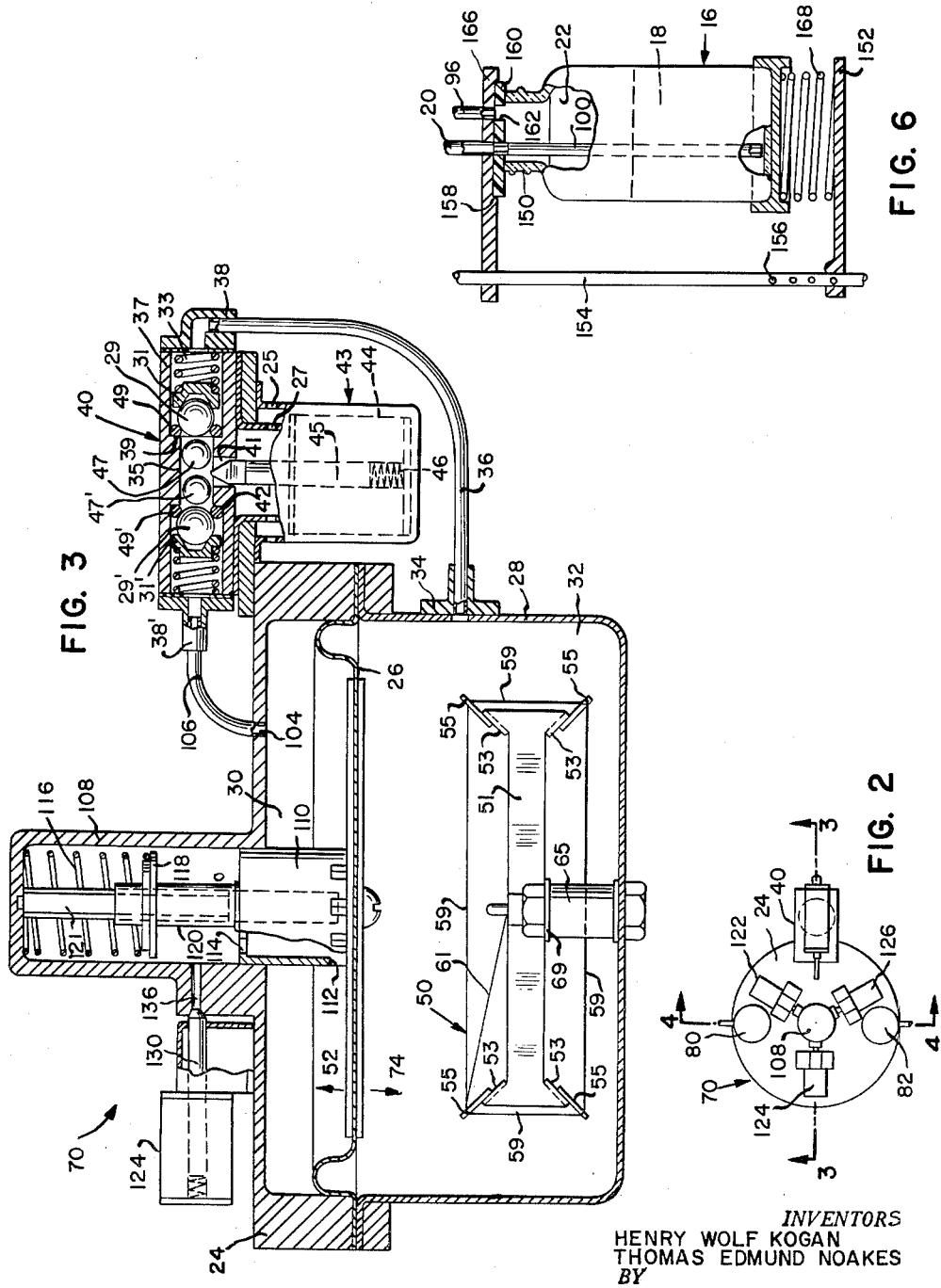

United States Patent Office 3,045,874
Patented July 24, 1962

3,045,874
AIR EXPANSION DISPENSER WITH
METERING MEANS
Henry Wolf Kogan, Oak Park, and Thomas Edmund
Noakes, Detroit, Mich., assignors to American Radiator & Standard Sanitary Corporation, New York, N.Y.,
a corporation of Delaware
Filed Apr. 1, 1960, Ser. No. 19,411
9 Claims. (Cl. 222—282)

This invention relates to an apparatus for dispensing predetermined quantities of liquid agent. More particularly the invention relates to a dispenser capable of dispensing liquid agent in metered amounts from a plurality of different reservoirs by means of a pumping action developed by the thermal expansion of a contained fluid body.

The present invention is particularly suited for use in connection with automatic domestic washing machines, as for example, clothes washing machines or dishwashing machines. It may conveniently be integrated into the time-cycle control system which directs the machine in a program in which the articles contained therein are washed, rinsed and dried. The liquid agent dispensed may be, for example, a wetting agent, a liquid detergent, bleach, or the like.

The invention is particularly characterized in that it may be used to dispense material from a plurality of reservoirs, each containing a different liquid agent. A further important characteristic of the dispenser is that it includes means for accurately controlling the amount of liquid agent dispensed, which means may be controlled remotely by the timer mechanism of the machine or by a manual selection switch or push button arrangement.

One object of the invention is to provide an apparatus of the above-mentioned character wherein the pumping operation for dispensing can be easily controlled by a simple device such as a single switch.

A further object of the invention is to provide such dispensing apparatus wherein component parts of the apparatus may be disposed in locations remote from one another, in order to facilitate mounting of the apparatus in different makes and models of washing machines.

Another object of the invention is to provide electrically-controllable means for setting the volume of liquid agent to be dispensed.

Yet another object is to provide apparatus for dispensing predetermined quantities of material by the application of heat, the apparatus being particularly designed so that inadvertent input of excessive quantities of heat is ineffective to cause damage to component parts of the mechanism.

Another object is to provide such dispensing apparatus which is of "fail-safe" construction.

Another object is to provide an electrically powered dispensing apparatus having a design whereby it is capable of discharging a relatively large volume of material with a relatively low current consumption, thereby promoting long contact life of the switch mechanism used to control the dispensing operation.

A futrher object is to provide dispensing apparatus which may be operably connected to different reservoirs to dispense different agents into a washing machine.

Another object of the invention is to provide an apparatus for dispensing corrosive materials such as wash additives, wherein air or non-corrosive medium is used as a pumping mechanism to avoid dissolving by the corrosive materials, it being appreciated that valves for corrosive materials must be constructed of high-cost non-corrosive metal.

A still further object is to provide dispensing apparatus which incorporates a minimum number of moving parts, thereby promoting a long service life.

Other objects of this invention will appear in the following description and appended claims, reference being had to the accompanying drawings forming a part of this specification wherein like reference characters designate corresponding parts in the several views.

In the drawings:

FIG. 2 is a plan view of one embodiment of the dispenser pumping apparatus of the present invention.

FIG. 3 is a side elevational view in section taken substantially along the line 3—3 of FIG. 2 looking in the direction of the arrows.

FIG. 6 is a view illustrating an embodiment of an additive reservoir as employed in the dispenser structure, with parts broken away for the purpose of clarity.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
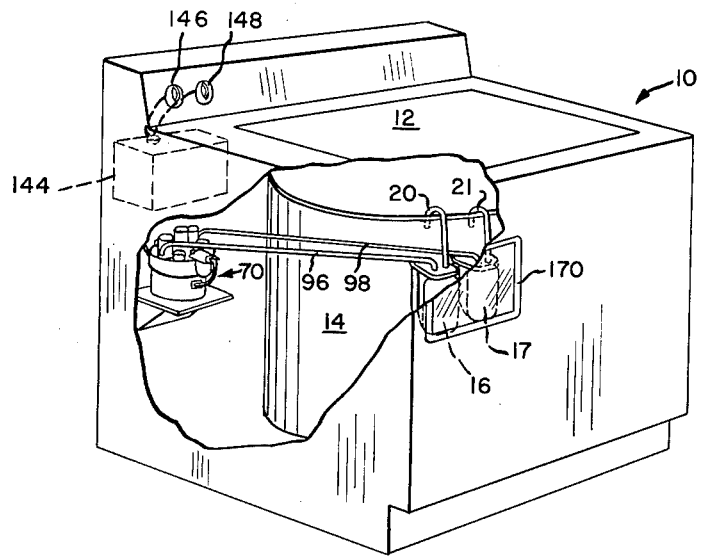
FIG. 1 is a perspective view of a clothes washing machine with a portion of the casing removed to show a typical mounting arrangement for the dispenser structure of the present invention.

The basic dispensing apparatus illustrated in the drawings is similar in many respects to the dispensing apparatus described in co-pending application Serial No. 772,503, filed November 7, 1958. The apparatus may be mounted in a conventional clothes washing machine 10 as shown in FIG. 1, having a tub access closure 12 overlying a clothes washing machine tub 14. The washing machine 10 is equipped with a pair of liquid agent dispenser reservoirs 16, 17 which may contain such liquid additives as detergents or wetting agents. Flexible conduits 20, 21 extend from the reservoir 16, 17 into a position for discharging into tub 14. Flexible tubes lead from a pumping apparatus 70 to an air space 22 in the upper portion of the reservoirs (see FIG. 6). In operation contained air is displaced from the pump to air space 22, causing the liquid 18 therein to be displaced, thereby forcing a portion of the liquid 18 from the reservoir through tubes 20, 21 into washing machine tub 14.

Figure 4:
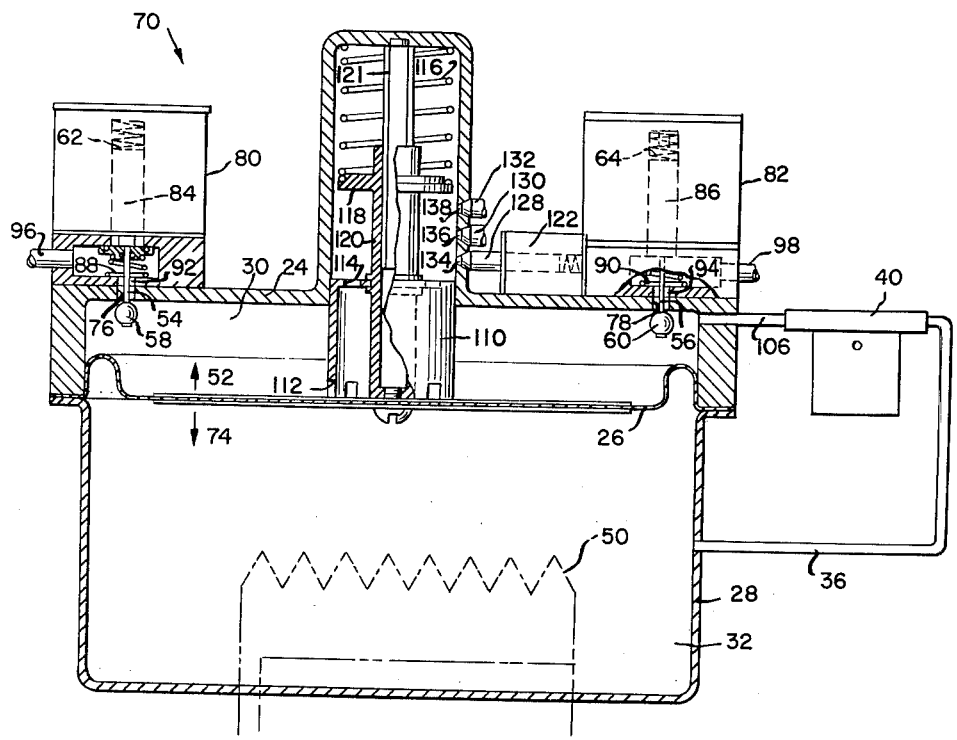
FIG. 4 is a view similar to FIG. 3 taken substantially along the line 4—4 of FIG. 2 looking in the direction of the arrows with the metering solenoids revolved from their normal position to illustrate their vertical relationship.

The pumping apparatus 70 is shown in FIGS. 3 and 4. This mechanism includes a casing member 24 closed by a diaphragm 26. A second casing member 28 overlies diaphragm 26, the arrangement of the two casing members and diaphragms serving to define two chambers 30 and 32 of inversely varying volumes, (i.e. when the diaphragm moves in the direction of arrow 74, the chamber 30 volume is increased and the chamber 32 volume is decreased, and conversely when the diaphragm moves in the arrow 52 direction the chamber 32 volume is increased and the chamber 30 volume is decreased).

As may be seen in FIG. 3, casing member 28 is provided with a vent fitting 34 which mounts a flexible tube 36. The other end of tube 36 is connected with a fitting 38 carried on a valve housing 40. Housing 40 is provided with a central opening 41 in its face 42, said face serving to mount solenoid structure 43 having a coil 44 surrounding an armature plunger 45. A compression spring 46 urges plunger 45 from its illustrated position towards a position engaged with cam elements 47 when coil 44 is de-energized. Energization of coil 44 returns the armature plunger to its illustrated position.

In the illustrated position of plunger 45, tube 36 and chamber 32 are sealed from the ambient atmosphere by an O-ring sealing element 49 which seals against an annular shoulder 39 defined by the intersection of bores 35 and 37 formed in housing 40. The sealing pressure is established by a compression spring 33 acting on a slidable guide element 31, said guide element serving to cradle a spherical element 29 which pressures against the O-ring to force it into a tight seal against shoulder 39.

When plunger 45 is moved by coil 44 into camming engagement with element 47, the resultant movement of spherical element 29 is effective to allow passage of air through the O-ring and around the peripheries of the elements 29, 47. Elements 31 and 45 are suitably constructed to permit passage of air thereby, as by forming openings therein or constructing the elements of such dimensions as to provide clearance spaces with the surfaces defined by the various bores. Air vent openings to atmosphere are provided at 27 and 25.

It will be appreciated from the above description that when coil 44 is energized, chamber 32 is sealed from the atmosphere, and when coil 44 is de-energized, chamber 32 is vented to atmosphere. In operation, during the period when chamber 32 is sealed, an electrical resistance heater 50 is energized to heat the trapped air in chamber 32 so as to expand said trapped air for forcing diaphragm 26 in the arrow 52 direction. Heater 50 preferably comprises a pair of end plates 51, each having four angularly turned flanges 53 which fixedly engage mica strips 55. Each of the mica strips is provided with a series of notches along its length to receive resistance wire 59, said wire being wrapped around the strip and having its end portions 61 connected to insulated terminals 65 carried on turned out portion 69 of the end plates 51. The terminals extend through openings in casing member 28 to receive leads (not shown) for energization of the heater.

It will be noted that the heater wires 59 are located centrally within chamber 32 (as opposed to being located on an exterior wall). The heater wires are entirely surrounded by the chamber 32 air (without being imbedded in their structure), and the mass of the support structure 51 and 55 is very low so as to extract very little heat during heater energization. These factors insure a rapid heating of the chamber 32 air with a fairly low heater temperature. The low heater temperature is of importance because of the low wattage required and the freedom from dangerous pressure conditions in the event of inadvertent heater energization over a prolonged time.

The above-described structure is, for the most part, common to both the present invention and the invention disclosed in the previously mentioned application Serial No. 772,503. The principal difference between the two inventions resides in the structure for metering the amounts of the charge dispensed and the structure which permits the operation of a plurality of liquid dispenser reservoirs from a single dispensing pump.

As can be seen in FIG. 4, a pair of openings 76 and 78 are provided in the chamber 30. Solenoid structures 80, 82 are mounted on the casing 24 and have plungers 84, 86. A pair of rods 54, 56 are provided in axial alignment with plungers 84, 86. The rods normally abut against the plungers but are not physically connected thereto. The rods carry valve elements 58, 60 which are adapted to sealingly seat in the openings 76, 78. A spring 88, 90 constantly urges the rods towards the closed position. A second stronger spring 62, 64 is provided in opposition to the springs 88, 90. When the solenoid coils are de-energized, the stronger springs 62, 64 overcome the weaker springs 88, 90, thus keeping the valves open as shown. Energization of either of the solenoids is effective to overcome the spring 62, 64, pressure and move the plungers out of the way to allow the valve elements to close under the action of springs 88, 90.

Each solenoid structure is provided with a passageway 92, 94, in registry with the openings 76, 78. A flexible tube 96, 98 leads from each passageway 92, 94 to communicate with the interior of the reservoirs 16, 17, respectively, as shown in FIG. 1. Assuming that the metering means (as will be more fully explained hereinafter) permit dispensing from reservoir 16 or 17, when electrical resistance heater 50 is energized to heat the air in chamber 32, the air in chamber 32 is caused to expand to force diaphragm 26 to move in the arrow 52 direction. This action causes chamber 30 to decrease in volume so as to force the gas in chamber 30 through the openings 76 or 78, assuming one of the valve elements 58, 60 are in the open position. It should be noted that both valve elements 58, 60 are normally in the open position and that dispensing takes place through ony one opening at a time. To dispense through opening 76, solenoid 82 is energized, closing opening 78, and to dispense through opening 78, solenoid 80 is energized, closing opening 76. The air displaced from chamber 30 is transmitted through tubes 96 or 98, to the space 22 in the reservoir. This displacement of air is effective to displace the liquid in the reservoir, forcing a portion upwardly through tube 100 and into the washing machine tub portion via the conduits 20, 21. It will of course be appreciated that there must be some build-up of air pressure before liquid displacement takes place. However, the pressures required are small in view of the small head of liquid and may be ignored when considering the amount of liquid dispensed.

It will be noted in FIG. 3 that an opening 104 is provided in casing 24. A flexible tube 106 extends from the opening 104 to fitting 38'. Suitable valve structure (similar to that formed by elements 47, 49, 29 and 31) is provided for putting tube 106 in communication with the ambient atmosphere when solenoid coil 44 is de-energized. The operation is such that when valve elements 49 and 49' are closed by solenoid 44, dispenser space 22 and chambers 30 and 32 are sealed from the atmosphere, the pressure in these chambers is determined by the condition of heater 50. As previously explained, when heater 50 is energized, diaphragm 26 is moved in the arrow 52 direction to develop an increased dispenser pumping pressure in space 22.

Metering means are provided to control the quantity of liquid agent dispensed from the reservoirs 16, 17. As will be noted in FIG. 4, a hollow projection 108 is provided on the casing 24. A hollow piston or valve element 110 is mounted on diaphragm 26 and extends slidingly into the hollow projection 108. Vent openings 112, 114 are provided at the lower and upper ends of the piston 110 to the end that the pressure above the piston is always the same as the pressure in the chamber 30. The diameter of the piston 110 is substantially equal to the inside diameter of the projection 108 whereby the outer walls of the piston will form a substantially air tight fit with the inner walls of the projection. If desired, a sliding seal element may be provided on the outer walls of the piston. Hollow piston rod 120 slidingly receives a guide rod 121 which is secured to the upper end of projection 108. A spring 116 is provided between a flange 118 on piston rod 120 and the upper end of the projection 108 to constantly urge the piston towards the position shown in FIG. 4. Three solenoids 122, 124 and 126 are mounted on top of the casing 24 as shown in FIG. 2 and spaced around the projection 108. The solenoids 122, 124, 126 each have a plunger 128, 130, 132 which seats in vertically spaced openings 134, 136, 138 provided in walls of the projection 108. The vertical spacing may be seen in FIG. 4 where the three solenoids have been revolved from their normal positions to illustrate the vertical spacing of the openings 134, 136 and 138.

In operation, if one of the solenoids 122, 124, 126 is energized to open its respective opening in the wall of the projection 108, the chamber 30 will be vented to atmosphere through the vents 112 and 114 of piston 110. There will be no dispensing until the piston 110 has advanced into the projection 108 to a point where the piston walls will close the opening in projection 108 to seal the chamber 30 to atmosphere. Prior to the closing of the opening, no liquid agent will be dispensed from the reservoirs 16, 17 because the pressure build-up in the chamber 30 will not be sufficient to dispense material from the reservoirs. The motion of the diaphragm is rather rapid after the heater has been energized. Openings 112, 114 and vent openings 134, 136, and 138 must be large enough to keep the pressure drop through them to a level lower than that necessary to dispense from the reservoir.

Subsequent to the closing of the projection 108 opening, pressure will build up in chamber 30 to cause air to be displaced to the reservoir space 22 and the liquid agent may be dispensed. However, the amount of agent dispensed will vary depending upon how far the diaphragm 26 travels after the chamber 30 is sealed. The maximum travel of the diaphragm 26 is limited by its distance from the inner surface of the casing 24. With the system shown, there are four possible metered charges. In one embodiment, the amount of the metered charge was varied from two ounces to eight ounces in two-ounce steps. The maximum charge will be dispensed when all of the openings in projection 108 are closed. In such a case, pressure in chamber 30 will begin to build up as soon as the diaphragm 22 begins to move and air will be immediately displaced into space 22 of the dispensers. The minimum charge will be delivered when the upper opening 138 is vented to atmosphere. The diaphragm 26 will have travelled approximately three-quarters of its maximum travel before dispensing begins in such a case.

After the dispensing operation is completed, it is necessary to return disphragm 26 to its initial position for a new dispensing cycle. Return of diaphragm 26 is automatically effected by opening valve elements 49 and 49' (i.e. by de-energization of solenoid 44). When elements 49 and 49' are open, the high pressure gas in chamber 32 is automatically vented through tube 36 to allow spring 116 to act on piston 110 and drive the piston and diaphragm 26 in the arrow 74 direction until the normal position is achieved. At the same time, the super-atmospheric pressure condition in chamber 30 is automatically relieved through the tube 106. The dispenser reservoirs 16 and 17 are also vented to atmosphere at the same time.

Figure 5:
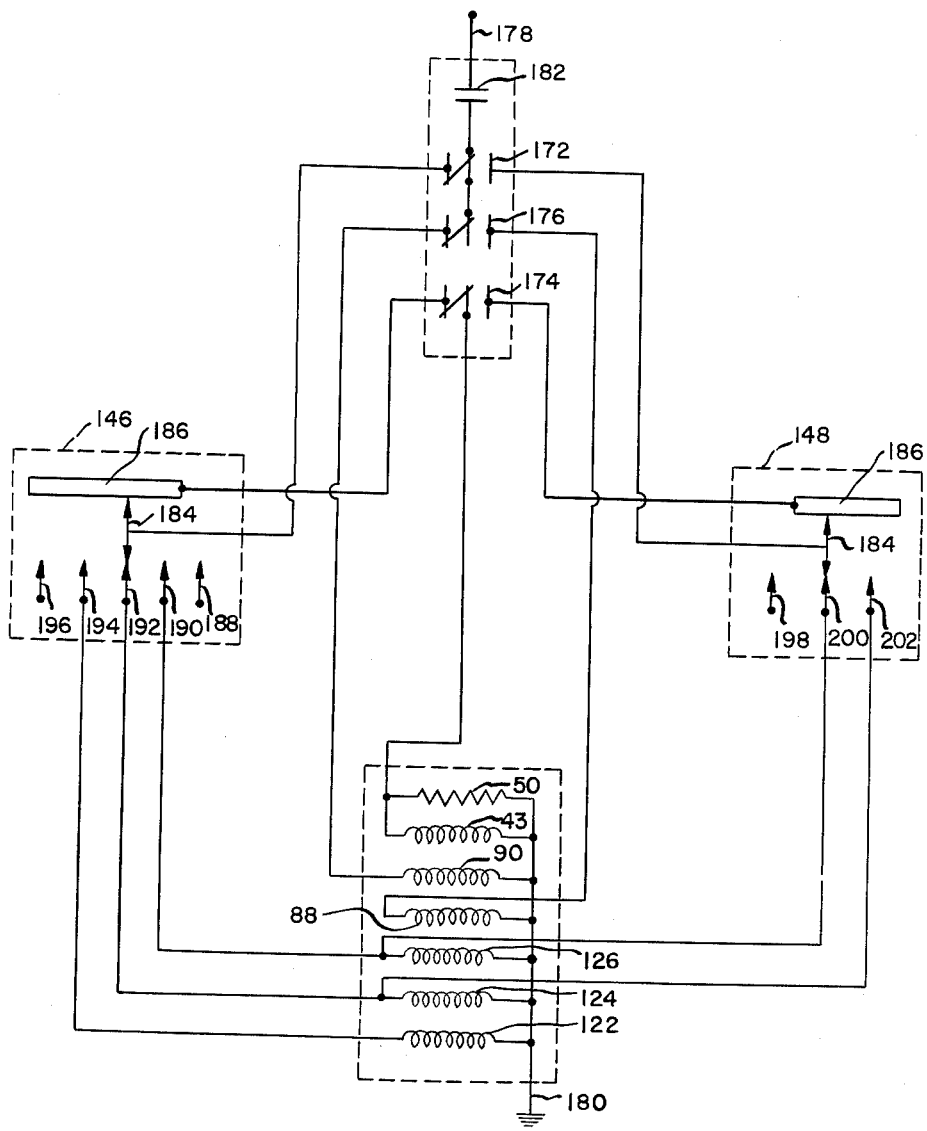
FIG. 5 is a schematic view illustrating the switching mechanism for the vent means and for the pumping apparatus and reservoirs.

Venting and dispensing are controlled by the circuit illustrated in FIG. 5. As thereshown, selector switches 146, 148 are provided to permit selection of the amount of agent to be dispensed from, respectively, reservoirs 16, 17. The switches 146, 148 are connected to power through contacts 172, 174 which are contained in the conventional timer mechanism 144 which is diagrammatically illustrated in FIG. 1. The switches 146, 148 are also connected to the windings of solenoids 122, 124, 126 to control the application of power thereto and consequently, the amount of agent dispensed. As will be noted, the windings of the reservoir solenoids 88, 90 are connected to power through timer contacts 176 and the heater 50 and vent solenoid 43 are connected to power through timer contacts 174. Power is applied to the circuit through lead 178, with the ground being applied at 180. Timer contacts 182 are provided to control the application of power to the circuit.

In operation, selector switches 146, 148 are positioned to set the amount of agent to be dispensed from each reservoir 16, 17. As shown, these switches are "slide" type switches having a sliding contact 184 which always contacts conducting member 186 when agent is to be dispensed and selectively contacts the spaced contacts (188— 196 of switch 146 and 198—202 of switch 148) to determine the amount dispensed.

When selector switches have been set, the washing machine may be started. At the proper points in the washing cycle, the timer mechanism 144 will close the normally open contacts 182, thus applying power to the circuit. At the same time, the double-throw contacts 172, 174, 176 will be closed by the timer. As shown, these contacts will permit power to be applied to switch 146. They may be thrown in the opposite direction to complete the circuit through selector switch 148. Depending on the position of sliding switch contact 184, power will be applied to solenoids 122, 124, or 126 to open the respective vent controlled thereby. If the contact 196 of switch 146 is made by sliding contact 184, none of the vent solenoids will be energized. This is the condition for dispensing a maximum amount as heretofore discussed. If the sliding contact 184 is on either contact 188 of switch 146 or 198 of switch 148, none of the solenoids will be energized. As will be noted, the conducting members 186 do not extend over contacts 188 or 198. Therefore, if the sliding contacts 184 are positioned on either of these locations, power will not be applied through the respective member 186. If power is not applied to member 186, there will be no energization, through switch 174, of heater 50 or vent solenoid 43. This is the zero position of the selector switches 146, 148 and is used when it is desired to not dispense a particular agent during the washing cycle.

Assuming that the conducting member 186 is contacted, a circuit will be completed through timer contacts 174 to energize heater 50 and vent solenoid 43. This will occur regardless of which reservoir 16, 17 is to be actuated. A circuit will also be completed through contacts 172 and series contacts 176 to energize either solenoid 88 or 90, depending upon which way the double throw contacts 176, 174 are closed. Energization of the various components as above-described will cause the dispensing action to take place as previously discussed. After dispensing, the timer 144 will open contacts 182 causing de-energization of the various components, at which time the venting action will take place.

The final unit of the dispensing apparatus is the liquid agent reservoir. FIG. 6 illustrates one of the reservoirs 16. As thereshown, the reservoir 16 is constructed as a conventional bottle having a threaded neck portion 150 adapted for reception on a conventional closure cap (not shown). Thus, the dispensing bottle with its cap can be sold and positioned in its support structure by the user without requiring the user to pour the bottle contents into a separate reservoir. In this manner, the danger of spilling the additive is minimized.

The support structure for the dispensing bottle includes a platform 152 which may be supported for vertical adjusting movements on a fixed standard 154 by a conventional manually operated spring-urged latch mechanism (not shown). The standard may be provided with a series of openings 156 for reception of the latch mechanism. Fixedly positioned on standard 154 is a lid structure 166 having a non-symmetrical recess 158 for releasable reception of a non-symmetrical rubber sealing element 160. The sealing element is provided with an opening 162 and tubular stem 100 which register with respective ones of tubes 96 and 20 when the sealing element is correctly seated in recess 158. The non-symmetrical character of recess 158 and sealing element 160 insures that the various passages at 20, 100, 96 and 162 will be correctly aligned.

To insert the dispenser bottle into its support structure, the user places the seal 160 stem 100 assembly into the bottle and merely moves the bottle downward and inward until seal 160 slips into place against structure 166. The spring 168 serves to maintain the neck of bottle 16 tightly engaged against sealing disc 160 and disc 160 tightly against structure 166 so as to provide an air-tight seal.

The aforementioned vertical adjustment of platform 152 allows the apparatus to accommodate bottles of differing heights for adapting the device to different brand additives and bottle sizes. Insertion and removal of the bottle into the washing machine takes place through a small access door 170 (FIG. 1) which may be partially or wholly transparent to permit visual observation of the bottle level contents.

Reference has heretofore been made to the "fail-safe" character of the apparatus. The "fail-safe" operation is made possible by the design wherein thermal energy is applied to the gas within chamber 32 by means of heater 50. The heater is a low-power unit which is sufficiently fast acting for satisfactory operation in the illustrated construction. However, if for any reason the heater switch should fail to de-energize the heater circuit, the design of the apparatus is such that the increased gas pressure in chamber 32 will not cause damage to the mechanism. In actual operation, excessively long energization of heater 50 causes heat to be lost to the ambient atmosphere. This lost heat balances the heat within the chamber 32 so as to provide a ceiling on the chamber 32 temperature. There is thus provided a "fail-safe" construction which operates without parts damage in the event of inadvertent heater energization.

We claim:

1. The combination comprising at least one liquid reservoir; a discharge conduit leading from the liquid contents of said reservoir; a contained gas in contact with said liquid contents; and pump means to displace said contained gas to in turn displace said liquid contents to dispense a portion thereof out of the discharge conduit; said pump means comprising an expansible gas chamber in contact with the contained gas; said expansible gas chamber being expandable to a predetermined size; means to thermally expand the gas in said chamber to cause chamber expansion with resultant displacement of the contained gas; and means responsive to a given chamber expansion to selectively vent the contained gas to atmosphere during a portion of the pump gas chamber expansion to permit metering the amount of liquid contents dispensed.

2. The combination comprising at least one liquid reservoir; a discharge conduit leading from the liquid contents of said reservoir; a contained gas acting on said liquid contents; and pump means to displace said contained gas to in turn displace said liquid contents to dispense a portion thereof out of the discharge conduit; said pump means comprising movable wall means in contact with the contained gas; said movable wall means being movable through a predetermined distance; means to move the wall means to displace the contained gas; and means responsive to a given movement of said wall means to selectively vent the contained gas to atmosphere during a portion of the wall means movement to permit metering of the amount of liquid contents dispensed.

3. A device as claimed in claim 2 and further characterized in that said vent means comprises at least one vent opening for the contained gas; means to selectively open the vent; and a valve element associated with the wall means and movable therewith; said valve element being operative to close the vent opening after a predetermined movement of the wall means.

4. A device as claimed in claim 2 and further characterized in the provision of a plurality of liquid reservoirs; and means to selectively contact said reservoirs with the contained gas.

5. The combination comprising at least one closed liquid reservoir; a discharge conduit leading from the liquid contents of said reservoir; and pump means to displace said liquid contents to dispense a portion thereof out of the discharge conduit; said pump means comprising a housing structure divided into first and second air chambers by a movable wall member; means to control the extent of movement of the wall member; means to thermally expand the air in said first chamber to move the movable wall member and reduce the volume of said second chamber to displace the air contained therein; said second chamber having a plurality of vent openings spaced at intervals from the movable wall member; means to selectively open said vents; and a valve element associated with the wall member and movable therewith; said valve element being operative to close the vent openings in sequence after a predetermined movement of the wall member; and conduit means connecting said second chamber with said closed liquid reservoir whereby the air displaced by movement of the wall member will cause displacement of the liquid contents in the reservoir when the vent openings are closed with the aforementioned resultant dispensing of a metered portion thereof.

6. A device as claimed in claim 5 and further characterized in that the movable wall means is a diaphragm.

7. A device as claimed in claim 5 and further characterized in the provision of a plurality of liquid reservoirs; conduit means connecting each reservoir with said second chamber; valve means for said conduit means; and means to selectively open said valve means to provide air communication between the second chamber and the reservoirs.

8. A device as claimed in claim 5 and further characterized in the provision of a hollow projection extending from the housing structure and having an open end communicating with the second chamber; said projection having a plurality of vent openings spaced at intervals from the movable wall member; means to selectively open said vents; and a valve element associated with the wall means and movable therewith; said valve element having a passageway therethrough, to provide continuous air communication between the interior of the hollow projection and the second chamber; said valve element being positioned to move in the hollow projection and operative upon movement to sequentially close each of the vent openings to thereby permit metering of the liquid dispensed.

9. A device as claimed in claim 5 and further characterized in the provision of means to vent to atmosphere the first and second chambers and the liquid reservoirs subsequent to a dispensing operation; and resilient means to return the movable wall member to its initial position upon such venting.

References Cited in the file of this patent

UNITED STATES PATENTS

| | | |
|---|---|---|
| 1,571,307 | Tikalsky | Feb. 2, 1926 |
| 2,513,455 | Cornelius | July 4, 1950 |
| 2,816,419 | Mueller | Dec. 17, 1957 |
| 2,914,217 | Warhue | Nov. 24, 1959 |